United States Patent [19]
Singewald et al.

[11] 3,760,941
[45] Sept. 25, 1973

[54] PROCESS FOR PREPARING HIGHLY FREE FLOWING ROCK OR TABLE SALT

[75] Inventors: Arno Singewald, Kassel; Gunter Fricke, Neuhof, both of Germany

[73] Assignee: Kali und Salz GmbH, Kassel, Germany

[22] Filed: May 4, 1971

[21] Appl. No.: 140,261

[52] U.S. Cl.................... 209/3, 209/11, 209/127 A
[51] Int. Cl.............................................. B03b 1/04
[58] Field of Search.................. 209/3, 4, 9, 127 R, 209/127 A, 127 B, 127 C

[56] References Cited
UNITED STATES PATENTS

| | | | |
|---|---|---|---|
| 2,997,171 | 8/1961 | Samsel | 209/127 R X |
| 3,052,349 | 9/1962 | Snow | 209/127 R X |
| 3,073,447 | 1/1963 | Autenrieth | 209/127 R |
| 3,480,139 | 11/1969 | Fricke | 209/127 R X |

FOREIGN PATENTS OR APPLICATIONS

| | | | |
|---|---|---|---|
| 752,222 | 8/1951 | Germany | 209/127 |
| 834,981 | 3/1952 | Germany | 209/127 |
| 1,157,563 | 11/1963 | Germany | 209/9 |
| 1,157,562 | 11/1963 | Germany | 209/9 |

*Primary Examiner*—Robert Halper
*Attorney*—Michael S. Striker

[57] ABSTRACT

Process for preparing highly pure substantially free flowing rock or table salt from salt containing small amounts of anhydrite and kieserite which comprises admixing the rock salt with an anti-caking agent in the dry state, warming the mixture to a temperature of between 40°–120°C and subjecting the same to the action of high pressure electrostatic field.

9 Claims, No Drawings

PROCESS FOR PREPARING HIGHLY FREE FLOWING ROCK OR TABLE SALT

This invention relates to a process for preparing highly pure substantially free flowing rock or table salt from rock salt containing small amounts of anhydrite kieserite and in particular up to 2.8 percent anhydrite and up to 0.6 percent kieserite in admixture therewith.

As is well known sodium chloride as achieved a great technical and physiological significance. It generally originates as oceanic deposits, either in solution or crystalline form. In the crystallizates, in addition to the sodium chloride, calcium and magnesium salts are present which are in general very disturbing as concerns the further use of the sodium chloride for instance for industrial purposes or as table salt.

Rock salt recovered from salinaren deposits and considered to be relatively free of impurities contains in addition to sylvite (KCl), also anhydrite $CaSO_4$, and also isolated amounts of kieserite ($MgSO_4.H_2O$). While KCl as an example of soluble alkali salts is without disturbing significance, anhydrite and kieserite because of their difficult or slow solubility have proved undesirable for technical use and also as table salt as it is not possible to prepare in the presence of these substances, transparent or clear salt solutions. The use of these preparations as table salt when the same contains any of the aforesaid type of impurities is furthermore interfered with because of the resultant sandy annoying texture of the salt.

Further the attempts to satisfactorily use sodium chloride originating from such mixtures by subjecting the same to heating and/or long treating times whereby an extensive solution of these inpurities takes place has also not proved satisfactory as the resulting salts still cannot be used for many chemical process as there are simultaneously present in the solution earth alkali ions which in particular in the dyeing industry give rise to undesirable flocculations. In water treating processes these earth alkali ion impurities are also particularly disturbing, as for instance in the regeneration of ion exchange columns in which exactly these calcium and magnesium ions which are present in the water to be used are also the ions to be displaced.

For the purification of crude for instance earth alkali containing sodium chloride minerals, many methods are known. Thus it has been proposed to purify sodium chloride minerals by dissolving the soluble alkali salts and then through multi-precipitation and filtering procedures to separate the soluble alkali metal salts from the insoluble materials and in particular the earth alkalis. The thusly purified brine or salt water solutions are then evaporated in vacuum evaporators or in open pans whereby finally crystalline sodium chloride is formed. By another known procedure, in this instance, a thermal purification is effected by dry heating sodium chloride at temperatures slightly above its melting point whereby the sodium chloride is converted into the liquid state and the liquid melt separated by decantation from the remaining solid materials and in particular from the calcium sulfate. There is thereby recovered a rock salt generally sufficiently free of calcium sulfate as to be suitable for most applications. However, in the case where a portion of a calcium sulfate succeeds in becoming dissolved or dispersed in the liquid sodium chloride melt, the degree of purity required by most industrial applications is not realized.

The saline salt crystallization and the melt processes require considerable outlays for equipment and power. In order to avoid the latter expenditures, processes have been proposed for the separation of sodium chloride and earth alkali ions which are based on flotation principles. According to this type of procedure the accompanying mineral impurities through specifically acting agents are hydrophobed and then through foam flotation separated off. The disadvantages of the calcium sulfate selective agents used in this connection is that the small grains of sodium chloride through corresponding selective additions are also hydrophobed and thus also floated off (DBP 1,190,895). While in such flotation procedures actually no thermal energy is required the procedure has the disadvantage that for operating the flotation machines considerable electric energy is required. Additionally, following the separation procedures the recovered sodium chloride concentrate and the residue must be separated by filtration or centrifugation whereby considerable losses of the salt occur and furthermore for the necessary freeing from the thusly recovered product of any adhering moisture, additional thermal energy has to be supplied. Finally the treatment conditions of the flotation process do not result in the production of as highly pure a sodium chloride concentrate as is in most cases required by industry. It is also a disadvantage that there remains residues of a hydrophobing agents on the rock salt granules which interfere in many technical applications and which also reduce the acceptance of the product when used as table salt.

It has also been proposed in connection with the working up of potassium crude salts or in the purification of intermediate and end products of the mineral mixtures associated with the potassium industry to utilize electrostatic separation procedures in respect to which a number of chemical reagents are used for facilitating the separation. There have been used in this connection reagents which are applied onto a carrier substance having a large surface and then this activated carrier agent added to the mineral dressing process. The carrier agent is utilized is an amount and degree of fineness sufficient to effect the separation. The carrier particles are crystalline and substantially void free in nature and are generally recovered as classification or as dedusting products, i.e., as fine grain fractions in the separation of mineral mixtures. Using such mixtures and particularly using as a dispersing agent a water of crystallization containing salt which water is easily split off and proceeding in this manner a potassium chloride concentrate of up to 95 percent can be obtained. Examples of such materials are for instance Glauber's salt, magnesium sulfate heptahydrate, schoenite, hydrates of magnesium or calcium chloride, sodium carbonate or other hydrates. These water of crystallization containing inorganic salts are, however, not anti-caking agents. To the same class belong the many water of crystallization free substances which however readily take up water. When MgO is used as amorphous carrier, the same being used in combination of salicylic acid, the yield of KCl concentrate is decreased (Wirtschaft U.S. Pat. No. 44,002).

By another known process magnesium sulfate is electrostatically separated from sodium chloride after the mixture or batch containing both has been treated with a chemical wetting liquid which can act to wet one of the ingredient. By the addition of a powder form or fine grain substance particularly high or particularly low electrical conductivity is imparted only to those particles on which the coating of wetting agent has been formed. This provides for the difference in electrical surface conductivity of the components of the batch mixture making an electrostatic separation possible. When MgO is used as the fine grain substance of low conductivity, there is lost through the presence of the wetting agent any activity residing therein as an anti-caking agent (DBP 834,981).

By another known process, principally sylvanite is through the use of any of the following: carboxylic acids and/or organic sulfonic acids and/or sulfuric acid esters and/or the salts, amides and anhydrides of the aforenamed substances and/or esters of carboxylic acids and/or such substances which witout carboxylic acids, sulfonic acids or acid sulfuric acid esters have acid properties as well as the salts of these substances and/or under use of phthalic acid or phthalic acid anhydrite or tetraphthalic acid anhydrite or saccharine as conditioning agent can be readily separated by electrostatic techniques. None of the aforenamed substances, however, constitutes an anti-caking agent.

When the residue of the crude salt contains rock salt, a second separating step using a chlorinated phenoxy acetic acid and/or chlorine or hydroxy substituted benzoic acid and/or chlorinated phenol or a salt of these compounds as conditioning agent for treating the residue are necessary, after which the mixture must again be subjected to an electrostatic separation. In this instance the aforementioned substances do not possess any anti-caking properties whatsoever (DAS 1,129,903).

It is an object of the invention to provide a process for producing substantially free flowing rock or table salt from rock salt containing small amounts of anhydrite and kieserite in a simple and economical manner.

It is another object of the invention to produce substantially free flowing rock or table salt having a high degree of purity.

These and other objects and advantages of the invention will be apparent from the following disclosure.

In accordance with the invention the above objects are attained by mixing the rock salt with a known anti-caking agent in the dry state, heating the resulting mixture at low temperature preferably at about 40° to 120°C and most preferably at about 60° to 80°C and thereafter subjecting the mixture to the activity of a high pressure electrical field. Thereby in a single pass a concentrate containing under 0.5 percent and preferably under 0.2 percent anhydrite and kieserite is separated from the residue.

The end product obtained in this manner has not only a considerably higher degree of purity than the products obtained according to the known methods but this result is realized through the simple addition of known readily available anti-caking agents which it must be noted have not up until now been used in the electrostatic separation of salt minerals.

In accordance with the invention the anti-caking agents are advantageously used in amounts of about 200 – 500 g/t and preferably in an amount of 250 g/t of rock salt.

According to a further proposal of the invention there are used as anti-caking agents, calcium phosphate, sodium carbonate, magnesium oxide, magnesium carbonate in powder form or magnesium stearate, edible oil or an unbranched fatty acid in particular those acids having 14, 16 or 18 carbon atoms in their molecules.

The process of the invention will be further illustrated with the aid of the following Examples. The invention is, however, not to be construed as limited in any way thereby.

In the Examples, the anti-caking agents were added to the salts and the resulting mixture introduced into Lodige mixture and mixed for one-half a minute. Thereafter the mixture was heated for 15 minutes in a drying chamber at 60° to 80°C. The separation of the anti-caking agent treated starting material was carried out in a known conventional free-fall separator at 4 kV/cm and a throughput of 5 t/m.hr.

The distribution of the recovered products has been summed up in tabular form. Exs. numbered 2 to 8 in Example I report in column b the anhydrite content in the condentrate and in the residue after a single pass through the free-fall separator and in column c of the corresponding kieserite contents have been set out.

EXAMPLE I

Rock salt, particle size 0.2–0.4 mm containing 1.3% anhydrite and 0.2% kieserite

| Ex- ample | a Anti-caking agent | Anhydrite-content conc. | b % residue | Kieserite-content conc. | c % residue |
|---|---|---|---|---|---|
| 1 | — | 1.1 | 2.4 | 0.15 | 0.36 |
| 2 | Synthetic Ca-phosphate | 0.14 | 4.1 | 0.03 | 0.50 |
| 3 | Edible oil | 0.14 | 5.7 | 0.07 | 0.62 |
| 4 | $Na_2CO_3$ pulverized | 0.16 | 3.9 | 0.03 | 0.39 |
| 5 | Mg-stearate powder | 0.27 | 3.4 | 0.11 | 0.22 |
| 6 | Fatty acid unbranched ($C_{14},C_{16},C_{18}$) | 0.38 | 7.1 | 0.17 | 0.44 |
| 7 | MgO | 0.27 | 10.3 | 0.28 | 0.66 |
| 8 | $MgCO_3$ | 0.38 | 4.5 | 0.11 | 0.50 |

In Examples 2 – 8 of Example I, the anti-caking agent was used in an amount of 220 g/t.

From the above, it can be seen that the initially present interfering earth alkali content, i.e., the 1.5 percent anhydrite and kieserite following treatment with the anti-caking agent and separation in an electrostatic field results in a concentrate removed at the cathode which in all cases contains under 0.5 percent and preferably under 0.2 percent of the interfering substances. In addition, very valuable rock or table salt having a purity of up to 99.8 percent is recovered.

Example II

Rock salt, particle size 0.2–0.4 mm containing 2.8% anhydrite and 0.6% kieserite

| Ex- ample | a Anti-caking agent | Anhydrite-content conc. | b % residue | Kieserite-content conc. | c % residue |
|---|---|---|---|---|---|
| 1 | — | 25 | 35 | 12 | 3 |
| 2 | Synthetic Ca-phosphate | 3 | 83 | 3 | 47 |
| 3 | Edible oil | 3 | 59 | 11 | 39 |
| 4 | $Na_2CO_3$ pulverized | 2 | 54 | 2 | 47 |
| 5 | Mg-stearate powder | 6 | 74 | 19 | 36 |
| 6 | Fatty acid unbranched ($C_{14},C_{16},C_{18}$) | 13 | 45 | 45 | 22 |
| 7 | MgO | 9 | 42 | 34 | 10 |

| 8 | MgCO₃ | 5 | 32 | 7 | 19 |

In the Examples 2 to 8 of Example II the anti-caking agent in each case was used in an amount of 250 g/t.

In Example II the anhydrite and the kieserite quantities in the concentrate and residue are given in columns b and c. This information is reported so that the quantitative distribution of the anhydrite and kieserite in the concentrate and residue is indicated in terms of percent (the amount introduced being equal to 100 percent).

A comparison of examples I and II with respect to the kieserite and anhydrite content in the concentrate and residue has been set out in Example IIb.

EXAMPLE IIb

| Example No. | Anhydrite-content conc. | % residue | Kieserite-content conc. | % residue |
| --- | --- | --- | --- | --- |
| 1 | 2.0 | 3.9 | 0.5 | 0.8 |
| 2 | 0.14 | 4.6 | 0.07 | 1.0 |
| 3 | 0.20 | 6.7 | 0.07 | 0.8 |
| 4 | 0.33 | 5.4 | 0.01 | 1.1 |
| 5 | 0.27 | 5.3 | 0.17 | 0.7 |
| 6 | 0.29 | 6.9 | 0.12 | 0.7 |
| 7 | 0.17 | 10.8 | 0.20 | 0.8 |
| 8 | 0.43 | 6.3 | 0.19 | 0.7 |

The evaluation of the Examples establishes the following surprising results.

The use of an anti-caking agent according to the above Examples has a surprisingly good effect on the up-take of the anhydrite and kieserite in the concentrate. The process according to the invention, therefore, offers the advantage that even with a feed having a low content of only 1.3 to 2.8 percent anhydrite and only 0.2 to 0.6 percent kierserite and with a single pass through the separator, valuable and saleable products are obtained. There is combined with this advantage the further advantage that pure products without a further addition of anti-caking agent having anti-caking properites are obtained.

As anti-caking agents there can be used any product operable and not interferring with the separation technique and which is suitable for use as a food stuff including the known inorganic and organic anti-caking agents of the types as set out in the specification and in the Examples. These agents are admixed with the crude salt and introduced into a mixer and in particle Lodiger mixer and then a heat treatment of the mixture is carried out at about 40° to 20°C and preferably at between 60° and 80°C. There need not be used in any of the foregoing steps any water or water-like solution or diluting agent. The exact amount of anti-caking agent required can be easily established by simple test procedures.

For carrying out the process according to the invention there are used the conventional free-fall separators having one or more stages. There can, however, be used any of the other known types of separators.

What is claimed is:

1. Process for preparing highly pure substantially free-flowing rock or table salt from rock salt containing small amounts of anhydrite and kieserite as impurities which comprises admixing such rock salt with an anti-caking agent of the group consisting of calcium phosphate, magnesium oxide, sodium carbonate, magnesium carbonate, magnesium stearate, an edible oil or an unbranched fatty acid having between 14 and 18 carbon atoms in its molecule, in the dry state, warming the resulting mixture to a temperature between 40° and 120°C and subjecting the said mixture to the action of an electrostatic field in a free fall separator and thereby separating said salt from said impurities.

2. Process according to claim 1 wherein said rock salt initially contains up to 2.8 percent anhydrite and up to 0.6 percent kieserite.

3. Process according to claim 1 which comprises warming the mixture to a temperature of from about 60° to 80°C.

4. Process according to claim 1 which comprises using said anti-caking agent in an amount of about 200 to 500 g/t.

5. Process according to claim 1 which comprises using said anti-caking agent in an amount of 250 g/t rock salt.

6. Process according to claim 1 wherein said sodium carbonate, magnesium stearate, calcium phosphate and magnesium oxide are used in powder form.

7. Process according to claim 1 wherein said mixture of anti-caking agent and rock salt is subjected to the action of an electrostatic field of 4 kV/cm using a single pass through said free-fall separator of 5 t/m.hr.

8. Process according to claim 1 wherein said said and anti-caking agent are mixed together for a period of one-half minute.

9. Process according to claim 1, wherein said mixture of salt and anti-caking agent is heated for 15 minutes at 60°–80°C.

* * * * *